US006163695A

United States Patent [19]
Takemura

[11] Patent Number: 6,163,695
[45] Date of Patent: Dec. 19, 2000

[54] MOBILE COMMUNICATION SYSTEM AND MOBILE COMMUNICATION METHOD THEREOF

[75] Inventor: Narihira Takemura, Kanagawa, Japan

[73] Assignee: NEC Corporation, Tokyo, Japan

[21] Appl. No.: 09/061,684

[22] Filed: Apr. 15, 1998

[30] Foreign Application Priority Data

Apr. 16, 1997 [JP] Japan .................................. 9-099149

[51] Int. Cl.$^7$ .................................................. H04Q 7/20
[52] U.S. Cl. ........................ 455/422; 455/432; 455/528; 455/565; 455/456
[58] Field of Search .................................. 455/421, 422, 455/404, 432, 456, 528, 67.1, 88, 565

[56] References Cited

U.S. PATENT DOCUMENTS

| 5,442,805 | 8/1995 | Sagers et al. ............................. 455/88 |
| 5,905,950 | 5/1999 | Anell ....................................... 455/421 |

FOREIGN PATENT DOCUMENTS

| 9-51576 | 2/1997 | Japan ........................... 455/FOR 100 |
| 96/29687 | 9/1996 | WIPO . |

OTHER PUBLICATIONS

"Conventional Local Area Radio Coverage System", by K. Weiss, et al., Motorola Technical Developments, vol. 13, Jul. 1, 1991, pp. 67–69.

*Primary Examiner*—Doris H. To
*Attorney, Agent, or Firm*—Scully, Scott, Murphy & Presser

[57] ABSTRACT

A mobile communication system and mobile communication method are capable of avoiding call-interruption while calling attention of the user who calls to be moved before entering transmission-stop zone. In the mobile communication method, it causes a base station ID to be received while retrieving all frequencies, thus judging whether or not there exists base station ID of "transmission-stop" instruction. When there is the base station ID of the "transmission-stop" instruction, it is judged that a mobile station exists in a transmission control zone, it comes into a state in which transmission is stopped, before coming into reception state. While when there is no the base station ID of the "transmission-stop" instruction, it is judged that a mobile station exists out of a transmission control zone, thus being selected a transmission destination. There is judged whether or not warning information is incorporated in base station ID of the transmission destination base station. When the warning information exists, the warning information/warning sound is generated, followed by shifting to normal operation. While when no warning information exists in the base station ID of the transmission destination, transmission is started to the transmission destination base station while shifting to the normal operation.

3 Claims, 7 Drawing Sheets

FIG. 7

| | BASE STATION IDENTIFICATION CODE (BASE STATION ID) | | | | | | | | | | | |
|---|---|---|---|---|---|---|---|---|---|---|---|---|
| | UNUSED REGION BIT | | | PRACTICALLY USED BASE STATION IDENTIFICATION CODE BIT | | | | | | | IN USE FOR RESPECTIVE INSTRUCTION AND INFORMATION |
| | MSB 11 | 10 | 9 | 8 | 7 | 6 | 5 | 4 | 3 | 2 | 1 | LSB 0 |
| | | | | | BASE STATION IDENTIFICATION CODE BIT | | | | | | | |
| 1 CONTROL FREE | 0 | 0 | 0 | 0 | SAME AS ABOVE | | | | | | | |
| 2 TRANSMISSION-STOP | 1 | 0 | 0 | 0 | SAME AS ABOVE | | | | | | | |
| 3 TRANSMISSION-STOP WARNING | 0 | 1 | 0 | 0 | SAME AS ABOVE | | | | | | | |
| 4 | 1 | 1 | 0 | 0 | SAME AS ABOVE | | | | | | | |
| 5 RESERVATION | 0 | 0 | 1 | 0 | SAME AS ABOVE | | | | | | | |
| --- | --- | --- | --- | --- | --- | | | | | | | |
| 15 RESERVATION | 0 | 1 | 1 | 1 | SAME AS ABOVE | | | | | | | |
| 16 RESERVATION | 1 | 1 | 1 | 1 | SAME AS ABOVE | | | | | | | |

MOBILE COMMUNICATION SYSTEM AND MOBILE COMMUNICATION METHOD THEREOF

BACKGROUND OF THE INVENTION

The present invention relates to a mobile communication system and a mobile communication method thereof.

DESCRIPTION OF THE PRIOR ART

In the conventional mobile communication system, there are provided an antenna, a transmission section, a reception section, and a control section which are connected to a public telephone network in a base station device. There are provided an antenna, a transmission section, a reception section, a control section, a transmitter and a receiver in a corresponding mobile station device. A communication is implemented between a general public telephone network and the mobile station device, or in between the mobile station devices through the base station devices. The mobile communication system is spreading rapidly and widely in recent years. Users increase suddenly. Together with the circumstances, electromagnetic interference comes into problem at the time communicating. The electromagnetic interference is caused by the fact that electromagnetic wave transmitted to be outputted from the transmission section/ antenna of the mobile station device penetrates another electronic equipments. The electromagnetic wave is generated from a great many user's portable telephones located at non-specific position, namely, the electromagnetic wave is transmitted to be outputted from the transmission section/ antenna of the many and unspecified mobile station devices. The electromagnetic wave which is radiated from antenna of many and unspecified mobile station device is in danger that it causes abnormal operation to be generated or it causes system function to stop while counteracting normal operation of the electronic equipments because the electromagnetic wave penetrates another electronic equipments which are not related to the mobile station communication line. Actually, social problems caused by electromagnetic interference is widely known in the information party concerned.

Formerly, there is provided a means for coping with the problem caused by the above-described electro-magnetic interference in answer to such a mobile communication system. Namely, there is provided with a means which causes a transmission control instruction such as "transmission-stop" instruction and "transmission output control" instruction and so forth to add to communication signal at the time of communication, followed by outputting and transmitting with respect to base station device supporting zone which is intended to be controlled with respect to occurrence of electro-magnetic noise, as a base station identification code (hereinafter referring to base station ID) in order to identify the base station device. While there is provided a means for judging a instruction content while receiving a transmission control instruction, and a means for controlling transmission output in answer to the transmission control instruction, inside of corresponding mobile station device.

FIG. 1 is a view showing an example of base station arrangement of the conventional mobile communication system. In the base station arrangement of FIG. 1, whole service area of the mobile communication system is composed of a base station A, a base station B, a base station C, a base station D, a base station E, a base station F, a base station G, a base station H, a base station I, a base station J, a base station K, a base station L, a base station M, a base station N, a base station 0, a base station P, a base station Q, aa base station R, a base station S, a base station T, a base station U, a base station V, and a base station W so as not to generate a dead zone among the respective individual service regions. For instance, when a medical facility exists within service region due to the base station A, it becomes necessary and indispensable applying condition that it causes whole transmission to stop from mobile station located within transmission possible zone of the base station A in order to prevent electro-magnetic interference to electronic equipments being in operation in the medical facility. Thus, when it causes transmission from the mobile station to stop, in the conventional mobile communication system, it causes "transmission-stop" instruction to add to a communication signal at the time communicating as the base station ID of the base station A, followed by transmitting the transmission control instruction to the corresponding mobile station device thereby, it causes transmission of respective mobile station device to stop. Above described conventional transmission control method is the method in which it becomes necessary condition on the communication procedure that it causes the base station ID transmitted from the base station device to be received inevitably before starting transmission while selecting transmission destination in the mobile station, or before starting transmission at the time hand over selecting switching destination base station in the mobile station. It becomes capable of communicating the transmission control instruction surely from the base station device to the mobile station device by this method.

FIG. 2 is a flow chart showing transmission start procedure of the mobile station device in the conventional mobile communication method, when it causes "transmission-stop" instruction to be added to the base station ID as the transmission control instruction from the base station device of the service region where transmission from the mobile station device is prohibited to be controlled. In FIG. 2, the mobile station causes carrier wave signal of all frequencies to retrieve, followed by receiving whole base station ID which is capable of being recognized at its maximum limits (step 61). Next, there is judged whether or not there exists an ID including "transmission-stop" instruction, even if it is only one ID within the received base station ID (step 62). When the ID including the "transmission-stop" instruction does not exist as a judging result in step 62, a point of the present time, it is judged that transmission control is not implemented to the zone where the mobile station is located, on account of this judgement, transmission from the mobile station device becomes capable of being implemented at all times, thus shifting to normal operation condition (step 63). While when the ID including the transmission-stop" instruction exists as a judging result even as one in step 62, a present time, it is judged that transmission control is implemented to the zone where the mobile station is located, on account of this judgement, transmission from the mobile station device is controlled as stop condition, thus implementing only reception operation (step 64). The transmission procedure shown in FIG. 2 is implemented inevitably, before the mobile station selects transmission destination base station to be started transmission, and before starting transmission at the time and over selecting a switching destination base station in the mobile station.

In the above-described conventional technology, for instance, a mobile station starts telephone call within the service area corresponding to the respective base stations including base stations B to W exception for the service area of the base station A in FIG. 1. When the mobile station enters into the service area of the base station A while calling to be moved, the mobile station results in reception of the base station ID including "transmission-stop" instruction, thus transmission on calling is compelled to stop immediately. For this reason, there occurs the problem to the user that call-interruption is implemented suddenly without consideration to call-utilization of the user. As a solution to such problems, for instance, it is capable of being realized in such a way that it causes outside-area warning information communication means of the conventional technology to apply. However practical function of the outside-area warning information communication means is that it causes sudden interruption of telephone call to prevent previously. This function is used in small zone method of mobile communication system. The user of the mobile station device goes out the support area of the base station unconsciously, with the result that call is interrupted suddenly. As a technique for this matter, a means for transmitting outside-area warning information using signal on a service channel at whole base station located at the most outer periphery of the support area is provided therewith. The outside-area warning information is transmitted to the user who is calling and moving located in service area of the most outer periphery base station, thus preventing call-interruption caused by moving.

However, as a channel being in use generally for mobile communication system, there exists a control channel being in use for respective mobile stations commonly in terms of signal of system information, respective control signals, and reception information and so forth, and a call channel being in use while allocating in every mobile station at the time communicating mainly. At the time waiting for telephone call-in, the mobile station monitors whether or not there is a telephone call-in while receiving a telephone call-in signal in every prescribed time interval on the control channel being transmitted from the base station with determined timing in every respective stations, in order to suppress consumption of battery. Consequently, only at the time a telephone call-in occurring, a telephone call is implemented while shifting to the call channel, with function on the control channel used. Consequently, when it causes means for transmitting the "transmission-stop warning" to possess to the peripheral base stations of transmission-stop zone, using function of the above outside-area warning information communicating means corresponding to conventional mobile communication system which is constituted by the service area shown in FIG. 1, instead of "outside-area warning", the "transmission-stop warning" information on the calling channel is received to be generated warning sound in the corresponding mobile station. FIG. 3 is a flow chart showing operation procedure in the mobile station device under above-described condition.

In FIG. 3, the transmission destination base station is selected, and then the base station ID of the base station is received (step 71). Subsequently, operation shifts to call-channel. Thereby a call-channel establishment demand signal is transmitted to the base station on the control channel, thus shifting to the call-channel using function of the control channel (step 72), then the call-channel is established (step 73). In the mobile station device, reception of the signal on the call-channel after establishment of the call-channel is started (step 74). At the same time, there is judged whether or not warning information is incorporated in the signal with the exception of sound signal (step 75). When the warning information is not incorporated, returning to the step 75 again, monitoring to the existence of warning information is implemented continuously. While when the warning information is incorporated therein in the judgement result of the step 75, an expression of the warning information or occurrence of warning sound is implemented, thus the warning information is communicated to the user of the mobile station device (step 76), followed by returning to the normal telephone call condition (step 77).

However, in the case of operation procedure of FIG. 3, the operation procedure is implemented on the assumption that it causes the warning information to notify to the user of the mobile station on calling, thereby in the above method by virtue of application of the conventional technology, there is no problem when the mobile station is of already on calling. However when the mobile station is within a call-in waiting condition, there is problem that it is incapable of being received warning information. This problem is caused by defect of conventional technology itself with regard to the outside-area information communication means. Namely, in general, in the mobile station device in the condition of a telephone call-in waiting, the current consumption of battery is prevented while implementing a telephone call-in acknowledgement (waiting), in such a way that signals (respective control information, system information and reception information and so forth) are received intermittently on the necessary control channel in every constant time interval. Consequently, it is incapable of monitoring the signal on the call channel, so that it becomes impossible to receive warning information transmitted as the signal on the call channel.

In the above described conventional mobile communication system and mobile communication method thereof, in order to stop transmission of a mobile station device in the transmission-stop service area, it causes transmission-stop zone to set while adding "transmission-stop" instruction to the base station ID of the base station device of the transmission prohibition zone, that is in use as the effective means. However, this conventional technology, when the user of the mobile station device on calling enters into the transmission-stop zone, there might have high possibility that the call communication is stopped immediately and unconditionally. Thus the conventional technology has defect on the utilization of the mobile communication system.

As the mobile communication method coping with the above defect, there is used the function of outside-area warning information communicating means being in use for the conventional method. In this method, when it causes means for transmitting "transmission-stop warning" to possess to base station at periphery of the transmission-stop zone instead of "outside-area warning", there is the defect that it is incapable of receiving warning information at the time reception waiting condition in terms of corresponding mobile station.

Further, in the conventional mobile communication system and mobile communication method thereof, it causes the "transmission-stop" instruction to monitor, together with the matter being required that it causes the warning information to monitor through the call channel for preventing an abuse caused by "transmission-stop" instruction in that it causes transmission to stop immediately within the transmission-stop zone. This is an inefficient control function to channel effective utilization. Thus, there is a defect that conventional mobile communication system is compelled to depend on the inefficient control function.

SUMMARY OF THE INVENTION

In view of the foregoing, it is an object of the present invention for avoiding the above-mentioned problems to provide a mobile communication system and a mobile communication method thereof which are capable of preventing previously that the user who is calling and moving enters the transmission-stop zone unconsciously before entering the transmission-stop zone, because it causes "transmission-stop warning" as a warning information to incorporate in base station ID to be transmitted from base station of the circumference of the transmission-stop zone.

In accordance with a first aspect of the present invention, for achieving the above mentioned object, there is provided a mobile communication system consisting of a plurality of base stations which have individual service area determined respectively, and many and unspecified mobile stations implementing communication while selecting the plurality of base stations voluntarily, wherein whole service area of the mobile communication system comprises at least more than one transmission prohibition service area which is provided as a transmission-stop zone, a plurality of transmission-stop warning service areas which are provided with as first warning zones respectively arranged to be bordered with outer circumference of the transmission prohibition service area, and a plurality of another individual service areas arranged at periphery of the plurality of transmission-stop warning service area, the mobile communication system comprises a transmission-stop control means for prohibiting transmission output by a mobile station device being provided for base station of the transmission prohibition service area, and a transmission-stop warning means for communicating to the user of the mobile station device that corresponding transmission prohibition zone is closer to the mobile station device itself being provided for the base station of the transmission-stop warning service area.

Preferably there is provided a mobile communication system wherein the transmission-stop control means includes function causing one base station identification code incorporating at least "transmission-stop" instruction to generate, followed by outputting and transmitting the one base station identification code, and the transmission-stop warning means includes function causing the other base station identification code incorporating at least "transmission-stop warning" information to generate, followed by outputting and transmitting the other base station identification code, or wherein the transmission-stop control means includes function causing a frame incorporating at least "transmission-stop" instruction and a base station identification code to form, followed by outputting and transmitting the frame, and wherein that transmission-stop warning means includes function causing a frame incorporating at least "transmission-stop warning" information and the base station identification code to form, followed by outputting and transmitting the frame.

In accordance with a second aspect of the present invention there is provided a mobile communication system consisting of a plurality of base stations having individual service area determined respectively, and many and unspecified mobile stations implementing communication while selecting one base station of the plurality of base stations voluntarily, wherein whole service area in the mobile communication system comprises at least more than one transmission prohibition service area which is provided as a transmission prohibition zone, a plurality of transmission-stop warning service areas which are provided as first warning zones respectively arranged in contact with periphery of the transmission prohibition service area, and a plurality of outside-warning service areas which are provided as second warning zone arranged at periphery of the whole service area, the mobile communication system comprises a transmission-stop control means for prohibiting a transmission output due to mobile station device being provided for base station of the transmission prohibition service area, a transmission-stop warning means for communicating to the user of the mobile station device that the mobile station device is approaching to the transmission-stop zone being provided for the base station of the transmission-stop warning service area, and an outside-area warning means for communicating to the user that corresponding mobile station is approaching to outside of the whole service area being provided for the base station of the outside-warning service area.

Preferably there is provided a mobile communication system wherein the transmission-stop control means includes a function causing at least a base station identification code incorporating "transmission-stop" instruction to generate, followed by outputting and transmitting the base station identification code, wherein the transmission-stop warning means includes a function causing at least an other base station identification code incorporating "transmission-stop warning" information to generate, followed by outputting, and transmitting the other base station identification code, and wherein the outside-warning means includes a function causing at least an another base station identification code incorporating "outside warning" information to generate, followed by outputting, and transmitting the another base station identification code, or wherein the transmission-stop control means includes a function causing at least a frame incorporating "transmission-stop" instruction and a base station identification code to form, followed by outputting, and transmitting the frame, wherein the transmission-stop warning means includes a function causing at least a frame incorporating "transmission-stop warning" information and a base station identification code to form, followed by outputting, and transmitting the frame, and wherein the outside warning means includes a function causing at least a frame incorporating "outside warning" information and a base station identification code to form, followed by outputting, and transmitting the frame.

In accordance with a third aspect of the present invention there is provided a mobile communication method for communicating between many and unspecified mobile stations or between the mobile station and a public telephone network through a plurality of base stations having individual service area determined respectively wherein a transmission starting procedure is implemented before starting transmission while selecting transmission destination, or before starting transmission at the time hand over selecting transmission destination base station, as the transmission starting procedure comprises the steps of, a first step for retrieving frequency of signal transmitted to be outputted from all base stations within whole service area in the mobile communication system, thus receiving a base station identification code of respective base stations which are capable of being recognized due to the retrieval, a second stop for judging whether or not there exists a base station identification code including "transmission-stop" instruction as a transmission control instruction among the received base station identification codes though it is only one "transmission-stop" instruction, a third step for judging that present location of mobile station is not a established transmission-stop zone which transmission output is being prohibited, when there does not exist the base station identification code incorporating "transmission-stop" instruction as a transmission control instruction in the second step, a fourth step for returning to reception operation state, namely returning to the first step while stopping transmission output, after judging that present location of the mobile station is located within the zone being established as the transmission-stop zone, when there exists the base station identification code incorporating "transmission-stop" as the transmission control instruction in the second step, a fifth step for selecting a transmission destination base station following the third step, a sixth step for judging whether or not warning information is incorporated into a base station identification code of the transmission destination base station selected in the fifth step, a seventh step for starting transmission to the transmission destination base station while shifting to normal operation when there is judged that warning information is not incorporated in base station identification code of the transmission destination base station in the sixth step, and a eighth step for starting transmission to the transmission destination base station while shifting to normal operation of the seventh step corresponding to a warning content after indicating warning information to user when warning information is incorporated in the base station identification code of the transmission destination base station in the sixth step.

Preferably there is provided a mobile communication method wherein the warning information which is taken as candidate of judgement in the fifth step is "transmission-stop warning" information informs that location of the mobile station is approaching to transmission prohibition zone, or wherein the warning information which is taken as candidate of judgement in the fifth step is "outside-area warning" information informs that location of the mobile station is approaching to outside-area of whole service area.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

BRIEF DESCRIPTION OF THE DRAWINGS

FIG. 7 is a view showing control information example of base station ID in the embodiment.

DETAILED DESCRIPTION OF THE PREFERRED EMBODIMENTS

A preferred embodiment of the present invention will now be described in detail referring to the accompanying drawings.

Figure 1:
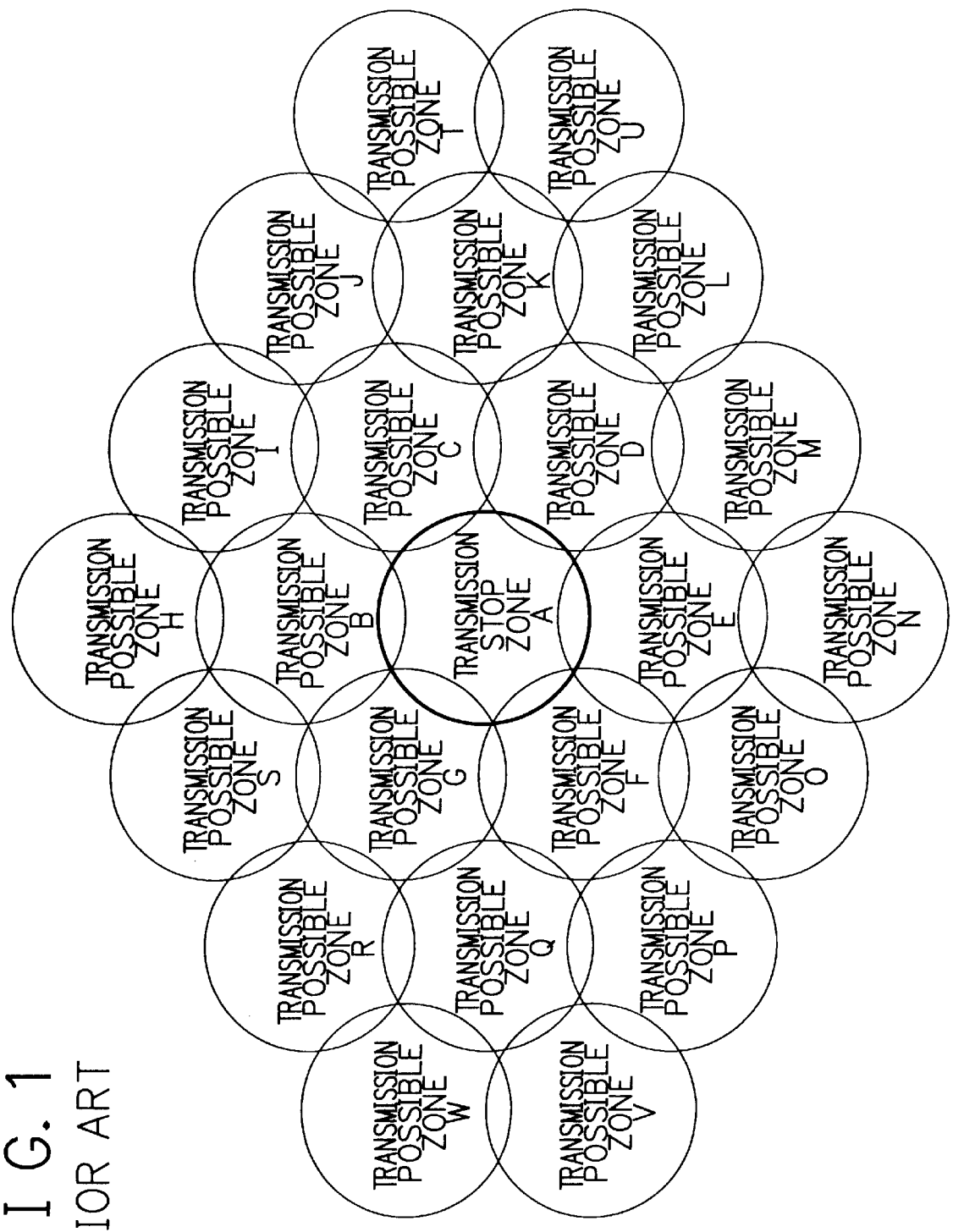
FIG. 1 is a view showing one example of base station arrangement in conventional service area.
Figure 2:
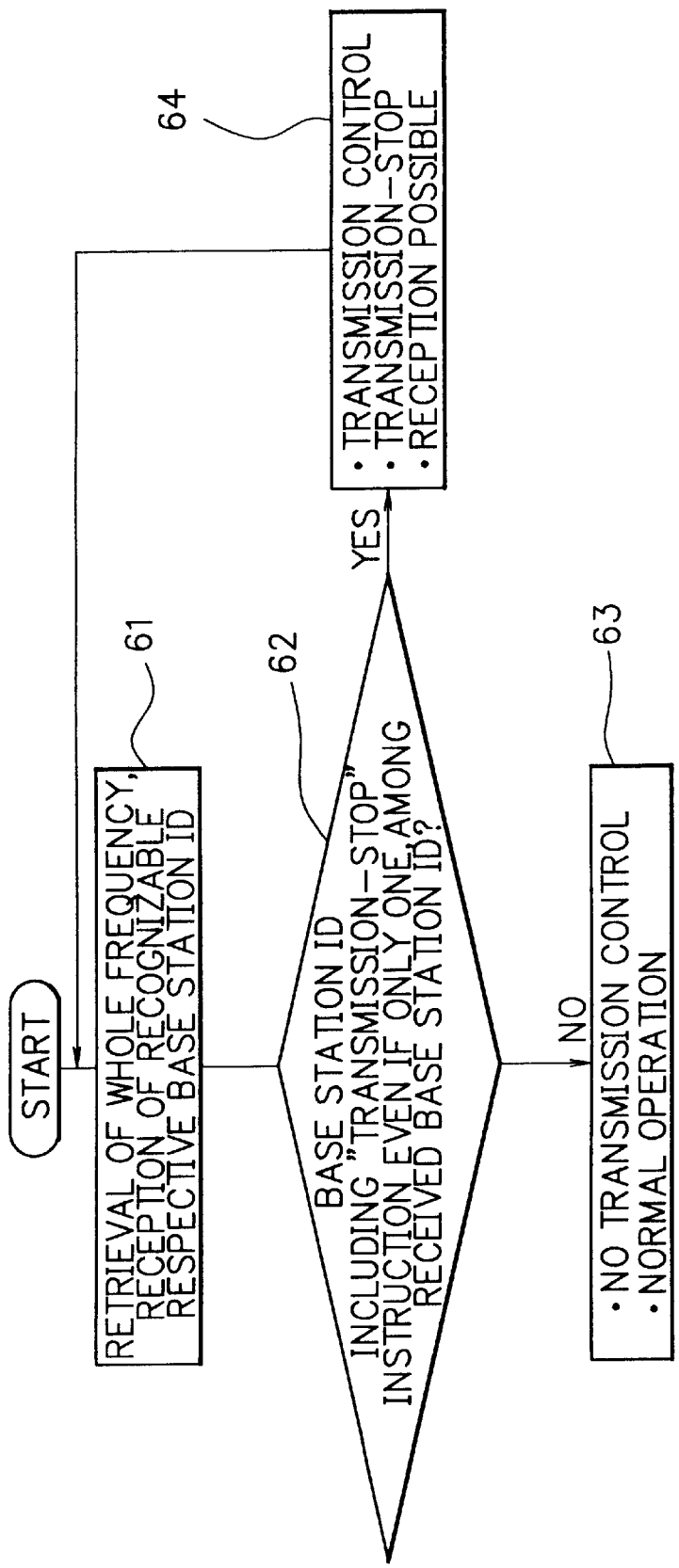
FIG. 2 is a flow chart (1) showing operational procedure of conventional mobile station device.
Figure 3:
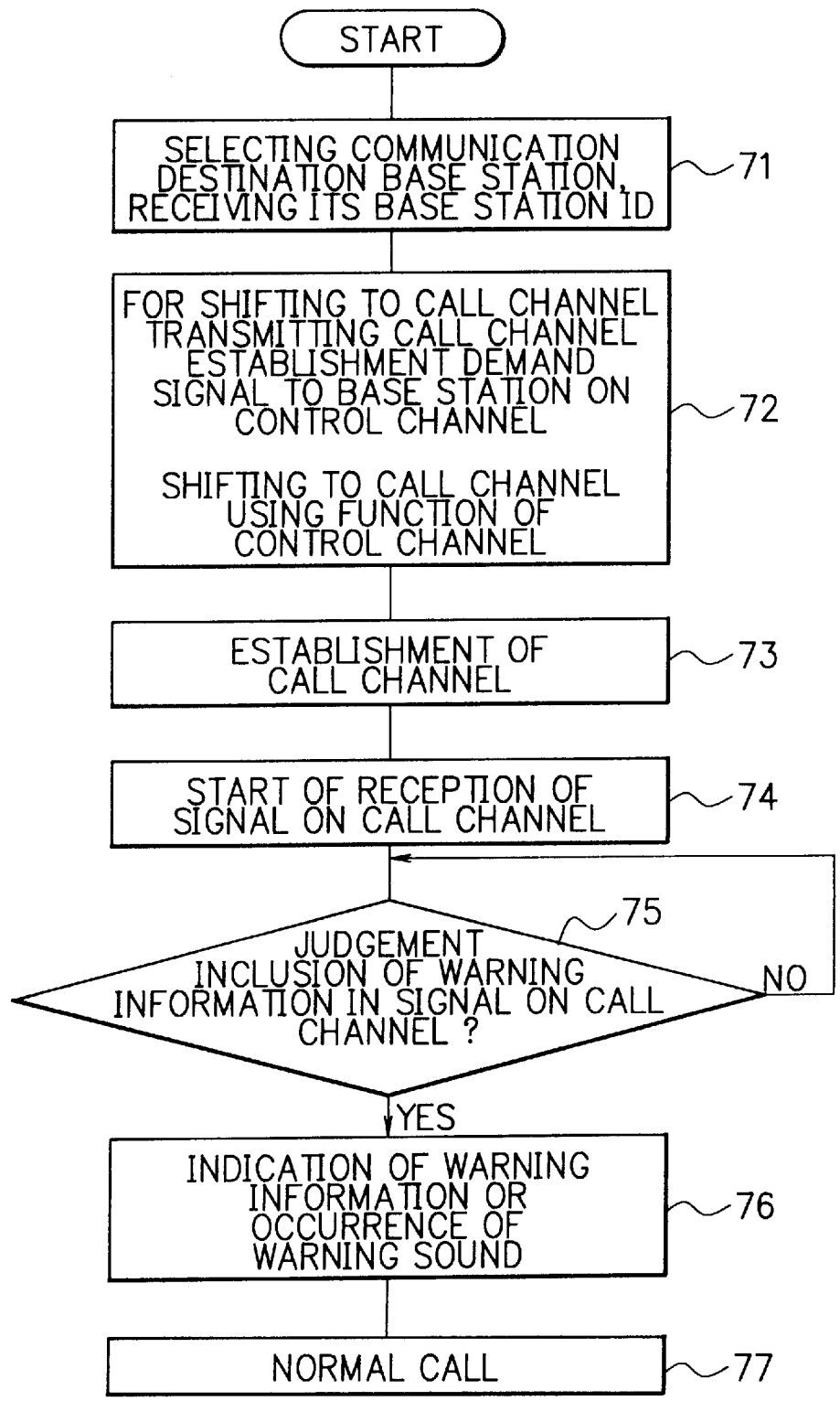
FIG. 3 is a flow chart (2) showing operational procedure of conventional mobile station device.
Figure 4:
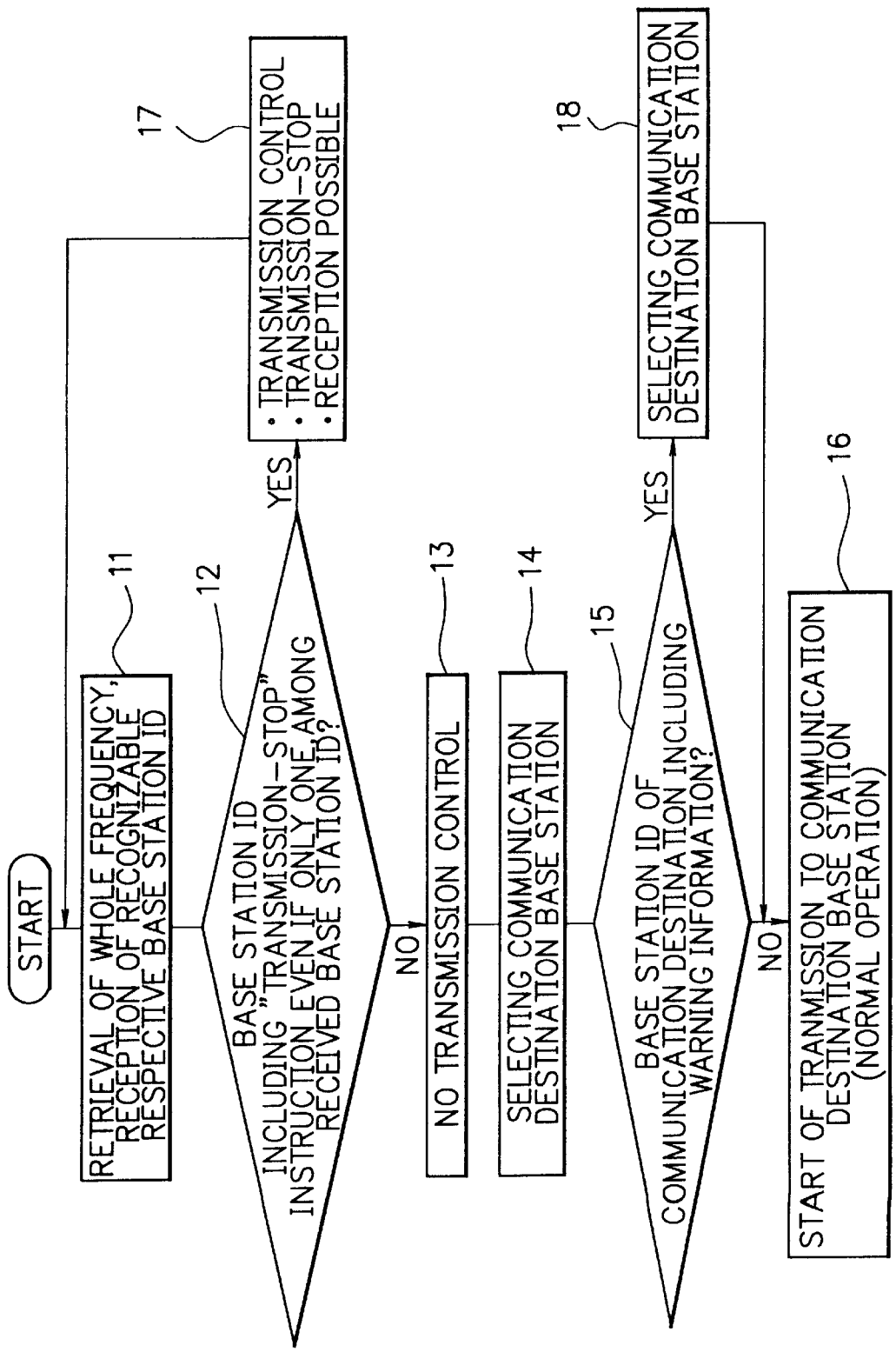
FIG. 4 is flow chart showing operational procedure of a mobile station device of one embodiment according to the present invention.
Figure 5:
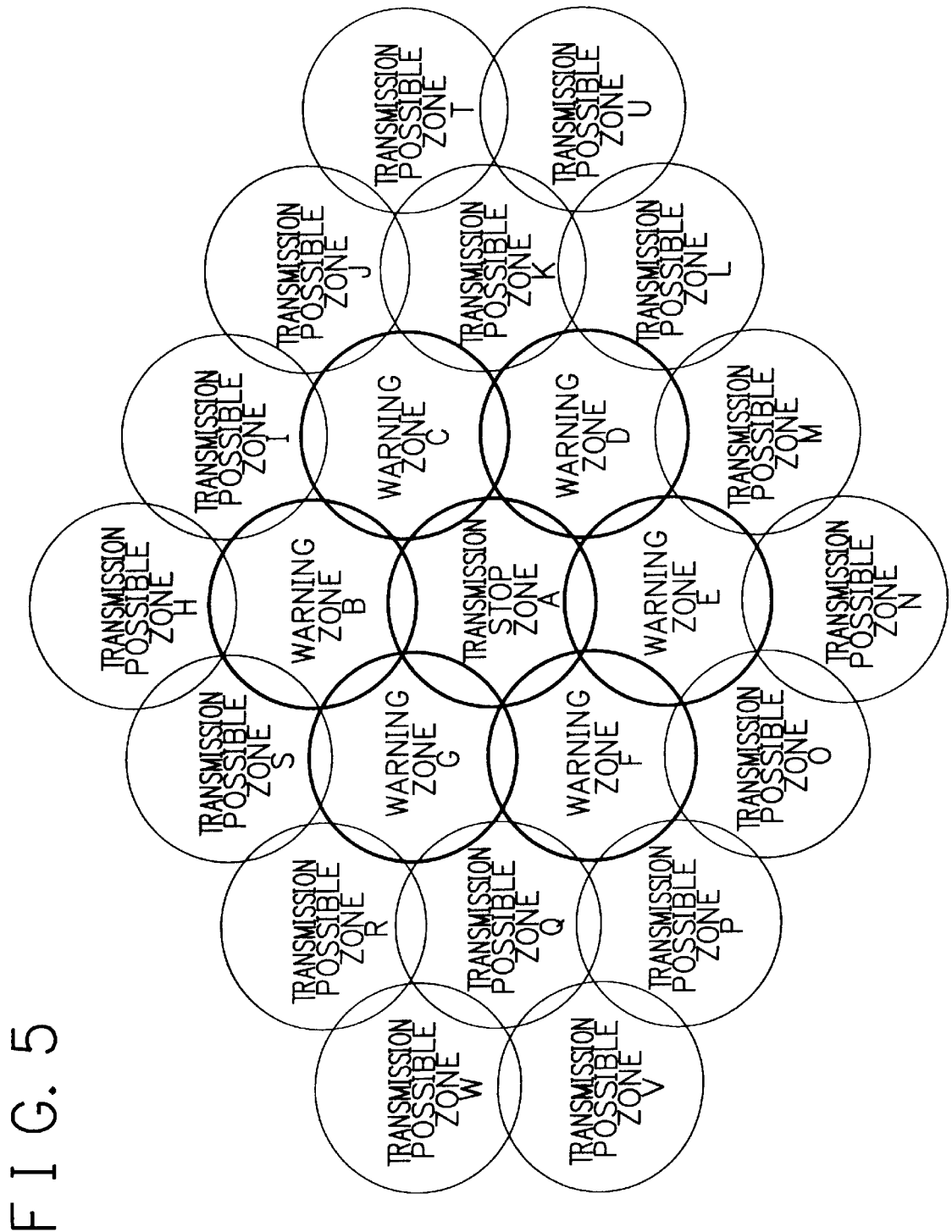
FIG. 5 is a view showing a first embodiment of a base station arrangement in service area of the embodiment.

FIG. 4 is a flow chart showing transmission start procedure of a mobile station according to one embodiment of a mobile communication method of the present invention. FIG. 5 is a view showing whole service area in one embodiment of the mobile communication system of the present invention. In FIG. 5, one example of base station arrangement is indicated. In this base station arrangement, it causes warning zone to provide around transmission-stop zone to be formed as a base station arrangement form. The base station arrangement is applied when it causes instruction of "transmission-stop" to add to the base station ID as control information and it causes information of "transmission-stop warning" to add to the base station ID as warning information. Hereinafter, the embodiment will be explained referring to FIGS. 4 and 5.

As described above, FIG. 5 shows the whole service area in one embodiment of the mobile communication system according to a present invention. The service area comprises a base station A, a base station B, a base station C, a base station D, a base station E, a base station F, a base station G, a base station H, a base station I, a base station J, a base station K, a base station L, a base station M, a base station N, a base station O, a base station P, a base station Q, a base station R, a base station S, a base station T, a base station U, a base station V, and a base station W. In this service area, the service area of the base station A is controlled as transmission-stop zone. Respective surrounding the base station B, the base station C, the base station D, the base station E, the base station F, the base station G of the transmission-stop zone are controlled as the transmission-stop warning zone.

In FIG. 5, a base station A is provided with a transmission-stop control means for stopping transmission output of a mobile station device. The transmission output of the mobile station device is penetrating service area of the base station A. While the base station B, the base station C, the base station D, the base station E, the base station F and the base station G which exist in outer circumferential service area of the base station A are provided with a transmission-stop warning means for communicating to the user of the mobile station device respectively that the transmission-stop zone is near. It is assumed that a mobile station is approaching to a transmission-stop zone of service area of the base station A. If it causes a zone being adjacent to the most outer circumference of the transmission-stop zone to be prescribed as a warning zone, the warning information described above is capable of transmitting to be communicated to the mobile station securely before entering the transmission-stop zone. For this reason, as stated above, the service area which is supported by the base station B, the base station C, the base station D, the base station E, the base station F, and the base station G are established as a transmission-stop warning zone. These base stations are provided with the transmission-stop warning means as described above.

Next, transmission start procedure of the mobile station in the one embodiment of the mobile communication method according to the invention will be explained referring to flow chart of FIG. 4.

In FIG. 4, the mobile station receives whole base station ID capable of recognizing, while retrieving carrier wave signal of whole frequency (step 11). Next, there is judged whether or not the base station ID includes "transmission-stop" of transmission control instruction among received base station ID, even if it is only one base station ID (step 12). In judgement result of the step 12, when the base station ID including instruction of "transmission-stop" exists even if it is one, at the present time, the zone at which the mobile station is located is judged as the zone which is established by a transmission establishment, the mobile station comes to be transmission-stop condition, thus being implemented reception operation as a mobile station (step 17). When one intends to implement transmission, returning to step 11 again, the operation procedure after the step 11 is executed repeatedly. In judgement result of the step 12, when no base station ID including instruction of "transmission-stop" exists, at the present time, the zone at which the mobile station is located is judged as the zone which is not established by the transmission establishment (step 13), thus being implemented selection of transmission destination base station (step 14). In this case, generally, as a transmission destination base station of subject of selection, the base station whose reception electric field strength is the most largest is selected among base stations capable of recognizing at the present time.

Next, in the step 14, there is judged whether or not the warning information is incorporated in the base station ID of selected transmission destination base station (step 15). When it is determined that the warning information is incorporated in the base station ID of the communication destination base station, it causes the warning information to display to mobile station display section, or it causes warning sound to generate in accordance with the warning information (step 18). Subsequently, transmission is started to the communication destination base station while proceeding to the normal operation (step 16). While judgement result of the step 15, when no warning information is incorporated in the base station ID of the communication destination base station, transmission to the communication destination base station is started immediately while proceeding to the normal operation (step 16). Operation procedure by the mobile station shown in FIG. 4 is sure to be executed in the mobile station before starting transmission while selecting the communication destination base station, and before starting transmission at the time of hand over when it causes switching destination base station to be selected in the mobile station.

Next, a second embodiment of a base station arrangement will be described. The second embodiment of the base station arrangement is realized by enlarging content of warning information in the first embodiment corresponding to base station arrangement in the mobile communication system of the first embodiment.

In this second embodiment, it causes "outside-area warning" information to add newly to the base station ID in addition to the "transmission-stop warning" instruction as a content of the warning information being incorporated in the base station ID. The base station located in the most outer circumference of the service area transmits to be outputted the "outside-area warning" information. Thereby, it is prevented that the user of the mobile station device goes out the service area unconsciously. Therefore, there is advantage that call disconnection is prevented from occurring.

Figure 6:
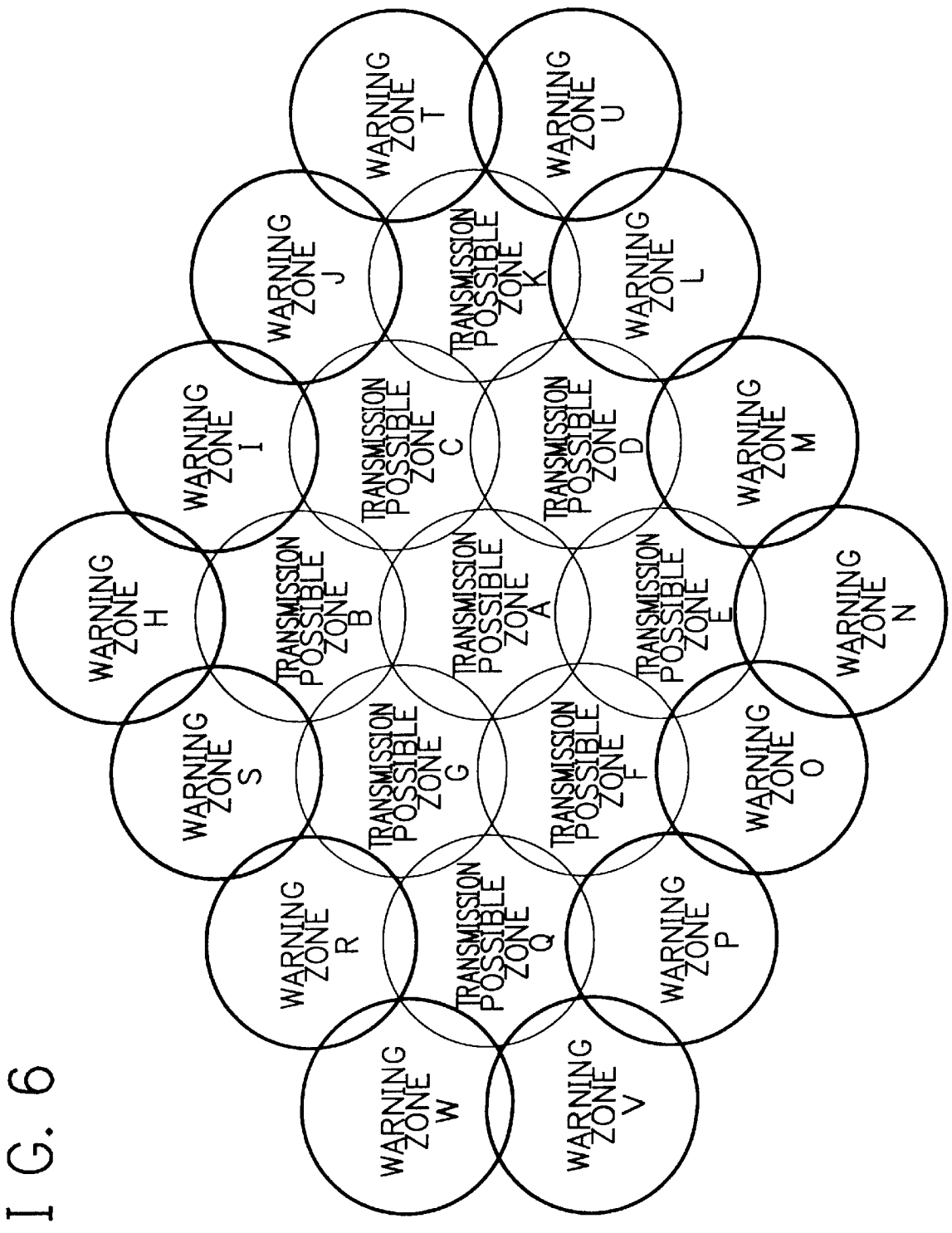
FIG. 6 is a view showing a second embodiment of a base station arrangement in service area of the embodiment.

FIG. 6 is a view showing base station arrangement configuration in the embodiment. The whole service area comprises the base station A, the base station B, the base station C, the base station D, the base station E, the base station F, the base station G, the base station H, the base station I, the base station J, the base station K, the base station L, the base station M, the base station N, the base station O, the base station P, the base station Q, the base station R, the base station S, the base station T, the base station U, the base station V, and the base station W. In the whole service area, the base station H, the base station I, the base station J, the base station T, the base station U, the base station L, the base station M, the base station N, the base station O, the base station P, the base station V, the base station W, the base station R, and the base station S are located at the most outer circumference of the whole service area. The respective base stations transmits warning information including "outside-area" information to the base station ID in terms of the mobile station. Thereby as described above, it is prevented that the user of the mobile station device goes out the service area unconsciously. Therefore, there is advantage that call disconnection is prevented from occurring. A control operation at the side of mobile station device caused by adding of the warning information is that it is proper to prepare corresponding warning display or warning sound. In the embodiment of the base station arrangement, the operation procedure at the side of the mobile station is implemented in accordance with the flow chart of FIG. 4. In this case, at the flow chart of FIG. 4, "outside-area" information is added to the warning information of step 15 as the content, namely judgement processing is implemented with respect to the content in which the "outside-area" information is added to the warning information of step 15. Another procedures are the same as that described above, explanation is omitted for avoiding repetition.

Next, it causes transmission control information or warning information or the like to be incorporated into the base station ID, now one embodiment of signal format of the transmission control information will be explained. It is assumed that a signal format of the base station ID is to be digital signal with 12 bits. It will be explained the cases of both of when bit number is not used yet as the base station ID, and when some bit number thereof are used already. When the bit number is not used yet, it is possible to add control instruction or warning information or the like thereto using a small bit of unused bits or whole bits among 12 bits which form the base station ID. For example, as shown in FIG. 7, when among base station ID of 12 bits, upper 4 bits which are to be used actually are not used as the base station ID, and it causes control instruction or warning information or the like to express with 4 bits, it comes to be possible to store 16 kinds of respective transmission control information or warning information or the like. For example, in turn from high order, "0000" is assigned to "no control instruction", "0100" is assigned to "transmission-stop warning", "1100" is assigned to "outside-area warning", . . . It is proper that remained bit parts are reserved for enlargement corresponding prospective instruction or information. When whole bits formed by 12 bits of the base station ID are used already, it causes more than necessary bit number to increase in order to represent the minimum respective control instructions or warning information or the like, by virtue of the increase, it becomes possible to incorporate these respective control instructions and warning information and so forth into the base station ID.

Further, when whole bits of the base station ID are used already, and if it causes the bit number representing the base station ID to be enlarged, there occurs problem on the communication system (communication protocol) caused by the enlargement of bit number, it is proper that it causes respective control instructions or warning information or the like to transmit utilizing usable area within a frame which is transmitted with base station ID inevitably. In this case, in the mobile station, it is proper to judge whether or not respective control instructions or warning information or the like are incorporated within the frame including base station ID (referring to step 12 and step 15 in the flow chart of FIG. 4). In this procedure, above judgement is implemented while retrieving inside of the area being in use for transmission of respective control instruction or warning information or the like within the frame including the base station ID. In the above described any cases, the mobile station stores information that respective control instruction or warning information or the like are incorporated in the base station ID itself, or respective control instruction or warning information or the like are incorporated in which part of the frame including the base station ID inevitably in prescribed memory and so forth. It becomes necessary to provide means for judging whether or not respective control instructions or warning information or the like are incorporated in the base station ID itself, while referring to information within the memory, when the base station ID is received, or when the frame including the base station ID inevitably is received.

As described above according to the present invention, there is provided function to stop the transmission output due to the mobile station device by the transmission-stop instruction being incorporated in the base station ID in the transmission-stop zone. In addition thereto, there is provided warning zone at circumference adjacent to the transmission-stop zone. Prescribed transmission-stop warning information is added to the base station ID of the base station, thus being transmitted to be outputted from respective base station of the warning zone. It becomes possible to call the user of the mobile station device which the user moves within the warning zone attention, before the user of the mobile station device enters within the transmission-stop zone, by virtue of this function, there is effect that it is capable of avoiding abnormal situation of sudden call interruption when the user enters in the transmission-stop zone unconsciously.

Respective warning zones are established to the service area located periphery of the whole service area. The base station ID to which outside-warning information is added is transmitted to be outputted from the respective base station of the warning zone so that it is capable of calling the user attention before going out to outside of the service area while going out from the warning zone. There is effect that it is capable of avoiding abnormal situation of sudden interruption of calling from occurring while going out the service area unconsciously.

Further when the user of the mobile station device is of no on-calling, it becomes possible to stay within the service area which is within the warning zone, by referring to the outside-warning information. There is effect that it is capable of maintaining reception waiting condition.

While preferred embodiments of the invention have been described using specific terms, such description is for illustrative purposes only, and it is to be understood that changes and variations may be made without departing from the spirit or scope of the following claims.

What is claimed is:

1. A mobile communication method for communicating between many and unspecified mobile stations or between the mobile station and a public telephone network through a plurality of base stations having individual service area determined respectively wherein a transmission starting procedure is implemented before starting transmission while selecting transmission destination, or before starting transmission at the time hand over selecting transmission destination base station, as said transmission starting procedure comprising the steps of:

a first step for retrieving frequency of signal transmitted to be outputted from all base stations within whole service area in said mobile communication system, thus receiving a base station identification code of respective base stations which are capable of being recognized due to the retrieval;

a second step for judging whether or not there exists a base station identification code including "transmission-stop" instruction as a transmission control instruction among the received base station identification codes though it is only one "transmission-stop" instruction;

a third step for judging that present location of mobile station is not an established transmission-stop zone which transmission output is being prohibited, when there does not exist the base station identification code incorporating "transmission-stop" instruction as a transmission control instruction in said second step;

a fourth step for returning to reception operation state, namely returning to said first step while stopping transmission output, after judging that present location of the mobile station is located within the zone being established as the transmission-stop zone, when there exists the base station identification code incorporating "transmission-stop" as the transmission control instruction in said second step;

a fifth step for selecting a transmission destination base station following said third step;

a sixth step for judging whether or not warning information is incorporated into a base station identification code of the transmission destination base station selected in said fifth step;

a seventh step for starting transmission to the transmission destination base station while shifting to normal operation when there is judged that warning information is not incorporated in base station identification code of the transmission destination base station in said sixth step; and a eighth step for starting transmission to said transmission destination base station while shifting to normal operation of said seventh step corresponding to a warning content after indicating warning information to user when warning information is incorporated in the base station identification code of the transmission destination base station in said sixth step.

2. A mobile communication method as claimed in claim 1, wherein said warning information which is taken as candidate of judgement in said fifth step is "transmission-stop warning" information informs that location of the mobile station is approaching to transmission prohibition zone.

3. A mobile communication method as claimed in claim 1, wherein said warning information which is taken as candidate of judgement in said fifth step is "outside-area warning" information informs that location of the mobile station is approaching to outside-area of whole service area.

* * * * *